US011139590B2

(12) United States Patent
Kaufmann et al.

(10) Patent No.: US 11,139,590 B2
(45) Date of Patent: Oct. 5, 2021

(54) ADAPTIVE SINGLE-ELEMENT ANTENNA APPARATUS AND METHOD OF OPERATING SAME

(71) Applicant: u-blox AG, Thalwil (CH)

(72) Inventors: Thomas Kaufmann, Zürich (CH);
Roderick Bryant, Conder in the Australian Captial Territory (AU)

(73) Assignee: U-BLOX AG, Thalwil (CH)

(*) Notice: Subject to any disclaimer, the term of this patent is extended or adjusted under 35 U.S.C. 154(b) by 0 days.

(21) Appl. No.: 16/745,277

(22) Filed: Jan. 16, 2020

(65) Prior Publication Data

US 2021/0226346 A1 Jul. 22, 2021

(51) Int. Cl.
| | |
|---|---|
| *H01Q 21/24* | (2006.01) |
| *G01S 19/30* | (2010.01) |
| *H01Q 3/24* | (2006.01) |
| *H01Q 21/00* | (2006.01) |

(52) U.S. Cl.
CPC .......... *H01Q 21/245* (2013.01); *G01S 19/30* (2013.01); *H01Q 3/247* (2013.01); *H01Q 21/0006* (2013.01)

(58) Field of Classification Search
CPC .. H01Q 21/245; H01Q 21/0006; H01Q 3/247; G01S 19/30
See application file for complete search history.

(56) References Cited

U.S. PATENT DOCUMENTS

| | | | |
|---|---|---|---|
| 6,252,553 B1 | 6/2001 | Solomon | |
| 6,771,218 B1* | 8/2004 | Lalezari | G01S 13/48 342/373 |
| 9,329,261 B2* | 5/2016 | Rofougaran | G06K 7/10316 |
| 10,615,499 B2* | 4/2020 | Lafleur | H01Q 1/38 |
| 2008/0111748 A1* | 5/2008 | Dunn | H01Q 1/243 343/702 |
| 2010/0195753 A1* | 8/2010 | Yamamoto | H01Q 9/0407 375/267 |

OTHER PUBLICATIONS

Emily McMillin, "Single Antenna Null-Steering for GPS & GNSS Aerial Applications," PhD Thesis (Mar. 2016).
Daniel Egea-Roca et al., "Design, implementation and Validation of a GNSS Measurement Exclusion and Weighting Function with a Dual Polarized Antenna," MDPI Sensors, 18, 4483; dol:10.3390/s18124483 (2018).
Jimmy LaMance and David Small, "Locate Correiator-Based Beam Forming Antenna Technology for Precise Indoor Positioning and Attitude," Proceedings of ION GNSS 2011, the 24th International Technical Meeting of the Satellite Division of the Institute of Navigation, Portland, Oregon, pp. 2436-2445 (Sep. 19-23, 2011).
Nicholas P. Lawrence and Derek Abbott,"Planar Slot Antenna with Circular and Vertical Polarization Diversity," Microwave and Optical Technology Letters, vol. 59, pp. 2479-2484 (2017).

* cited by examiner

*Primary Examiner* — Lam T Mai
(74) *Attorney, Agent, or Firm* — Finnegan, Henderson, Farabow, Garrett & Dunner LLP (57) ABSTRACT

An apparatus includes an antenna assembly including an antenna configured to receive a signal and generate, at a plurality of feed points of the antenna, a plurality of corresponding polarized signals having respective polarization directions different from each other, using the received signal; and a switching circuit configured to periodically switch between the plurality of feed points to select a corresponding one of the polarized signals among the plurality of polarized signals at a point of time based on a switching signal.

18 Claims, 3 Drawing Sheets

ADAPTIVE SINGLE-ELEMENT ANTENNA APPARATUS AND METHOD OF OPERATING SAME

FIELD

The present disclosure relates generally to an antenna, and more particularly, to apparatus including an antenna assembly capable of switching between a plurality of feed points and a receiver capable of processing a signal from the antenna assembly in coordination with the switching, and method for operating thereof.

BACKGROUND

A global navigation satellite system (GNSS) receiver receives a satellite signal transmitted from a GNSS satellite constellation through an antenna. Before arrival at the antenna, the satellite signal may be scattered, reflected, or refracted in space, for example, by mountains or buildings, causing multipath interference at the antenna. Or the antenna may suffer from a spoofing attack that deceives the receiver with false signals. Or the antenna may suffer from noise broadcasted from a jamming device on the same frequency used by one or more satellites of the GNSS satellite constellation.

Multipath interference, spoofing, and jamming may be mitigated by null steering in which the GNSS receiver steers away from an unwanted signal in one direction and focuses on another direction. Null steering may be accomplished by adding hardware (e.g., a multi-antenna array) in the receiver's frontend and additional signal processing blocks in the receiver's backend. However, this increases the size and cost of the receiver.

SUMMARY

According to some embodiments of the present disclosure, there is provided an apparatus. The apparatus includes an antenna assembly including an antenna configured to receive a signal and generate, at a plurality of feed points of the antenna, a plurality of corresponding polarized signals having respective polarization directions different from each other, using the received signal; and a switching circuit configured to periodically switch between the plurality of feed points to select a corresponding one of the polarized signals among the plurality of polarized signals at a point of time based on a switching signal.

According to some embodiments of the present disclosure, there is also provided a method for operating a device, wherein the device includes an antenna configured to receive a signal and generate a plurality of polarized signals having respective polarization directions different from each other. The method includes: generating a switching signal; controlling a switch in the antenna based on the generated switching signal; time-division multiplexing the plurality of polarized signals using the switch; determining a desired amplitude and a desired phase for each of the plurality of polarized signals; assigning a complex weight to each of the plurality of polarized signals, wherein the complex weight includes a weight of an amplitude and a weight of a phase; and correlating the plurality of time-division multiplexed polarized signals.

According to some embodiments of the present disclosure, there is further provided a non-transitory computer-readable medium having stored therein instructions that, when executed by a processor, perform a method for controlling a device, the method including: generating, by the device, a switching signal; transmitting, to an antenna assembly, the generated switching signal so that the switching signal drives a switch in the antenna assembly; receiving, from the antenna assembly, a time-division multiplexed signal generated by periodically selecting a polarized signal from a plurality of polarized signals based on the switching signal; determining, by the device, a desired amplitude and a desired phase for each of the plurality of polarized signals; assigning, by the device, a complex weight to each of the plurality of polarized signals, wherein the complex weight includes a weight of an amplitude and a weight of a phase; and correlating, by the device, the plurality of time-division multiplexed polarized signals.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of systems, apparatuses, and methods consistent with aspects related to the present disclosure as recited in the appended claims.

Multipath interference causes severe problems in GNSS navigation solutions, especially in a complex propagation environment (e.g., mountains, buildings, urban canyons, foliage, etc.). A GNSS satellite transmits a right hand circularly polarized (RHCP) electromagnetic wave. However, in a complex propagation environment, the direction of rotation of the electric field vector of the RHCP electromagnetic wave can be changed due to an interaction of the electromagnetic wave with the environment. This may cause difficulty in determining polarization of the electromagnetic wave transmitting in a complex propagation environment.

Spoofing attacks or jamming attacks are another challenge in GNSS navigation solutions. For example, a spoofing signal transmitted from an unknown source attempts to deceive a GNSS receiver. A jamming signal transmitted on the same frequency as a signal transmitted by a GNSS satellite deteriorates the ability of a GNSS receiver to receive the GNSS satellite signal. Accordingly, multipath interference, spoofing, and jamming are significant threats to autonomous vehicles that rely on trustworthy global position information.

Multipath interference, spoofing, and jamming in a GNSS receiver may be mitigated by null steering or beam steering in which the GNSS receiver blocks unwanted signals from one direction or focuses on desired signals from another direction. Null steering (or beam steering) may be accomplished by adding hardware in the receiver's frontend, for example, using a multiple-antenna array, and additional signal processing blocks in the receiver's backend. However, this increases the size of the system and adds cost to the system design. Moreover, null steering may only be performed globally, that is, the null steering is simultaneously applied to all satellites signals, thereby affecting accuracy and flexibility of the mitigation.

Embodiments of the present disclosure provide an apparatus including an antenna assembly and a receiver. The antenna assembly includes an antenna having a plurality of feed points that generate a plurality of corresponding polarized signals having respective polarization directions different from each other. The antenna assembly also includes a switching circuit including a switch that periodically switches between the plurality of feed points to select a corresponding one of the polarized signals among the plurality of polarized signals at a point in time to form a time-division multiplexed signal. The receiver generates a switching signal that controls the switch in the antenna assembly. The time-division multiplexed signal is filtered and amplified in the antenna assembly and then transmitted to the receiver. The receiver processes the time-division multiplexed signal in the digital domain and then controls generation of the switching signal based on the processing. For example, the receiver determines a desired amplitude and a desired phase for each of the plurality of polarized signals, and assigns a complex weight to each of the plurality of polarized signals based on the determined desired amplitude and phase for each of the polarized signals. The receiver includes a correlator having a plurality of correlator channels. Each of the plurality of correlator channels is assigned to a different one of a plurality of signals respectively transmitted from a plurality of different satellites. Each of the plurality of correlator channels independently processes a corresponding one of the plurality of satellite signals.

Embodiments disclosed herein have one or more technical effects. By using a switch in order to switch between the plurality of antenna feed points, time-division multiplexing the plurality of signals having different polarization directions, and processing the time-division multiplexed signal in the digital domain in the receiver, a need for recombining the polarized signals using hardware in the RF domain is eliminated, leading to a reduced size, a reduced cost, and reduced power consumption of the receiver. Performing filtering and amplification of the time-division multiplexed signal in the antenna assembly, rather than in the receiver, provides enhanced immunity of the operation to temperature fluctuation. By determining the desired phase and the desired amplitude for each of the plurality of polarized signals and assigning the complex weight including the desired phase and the desired amplitude to each of the plurality of polarized signals, null steering is accomplished during correlation of the signals. By assigning each of the plurality of correlator channels to a different one of the plurality of signals respectively transmitted from a plurality of different satellites and applying the complex weight individually to each signal in each of the plurality of correlator channels, null steering is performed individually for each of the satellite signals, leading to enhanced accuracy of mitigation of multipath interference, jamming, and spoofing.

Figure 1:
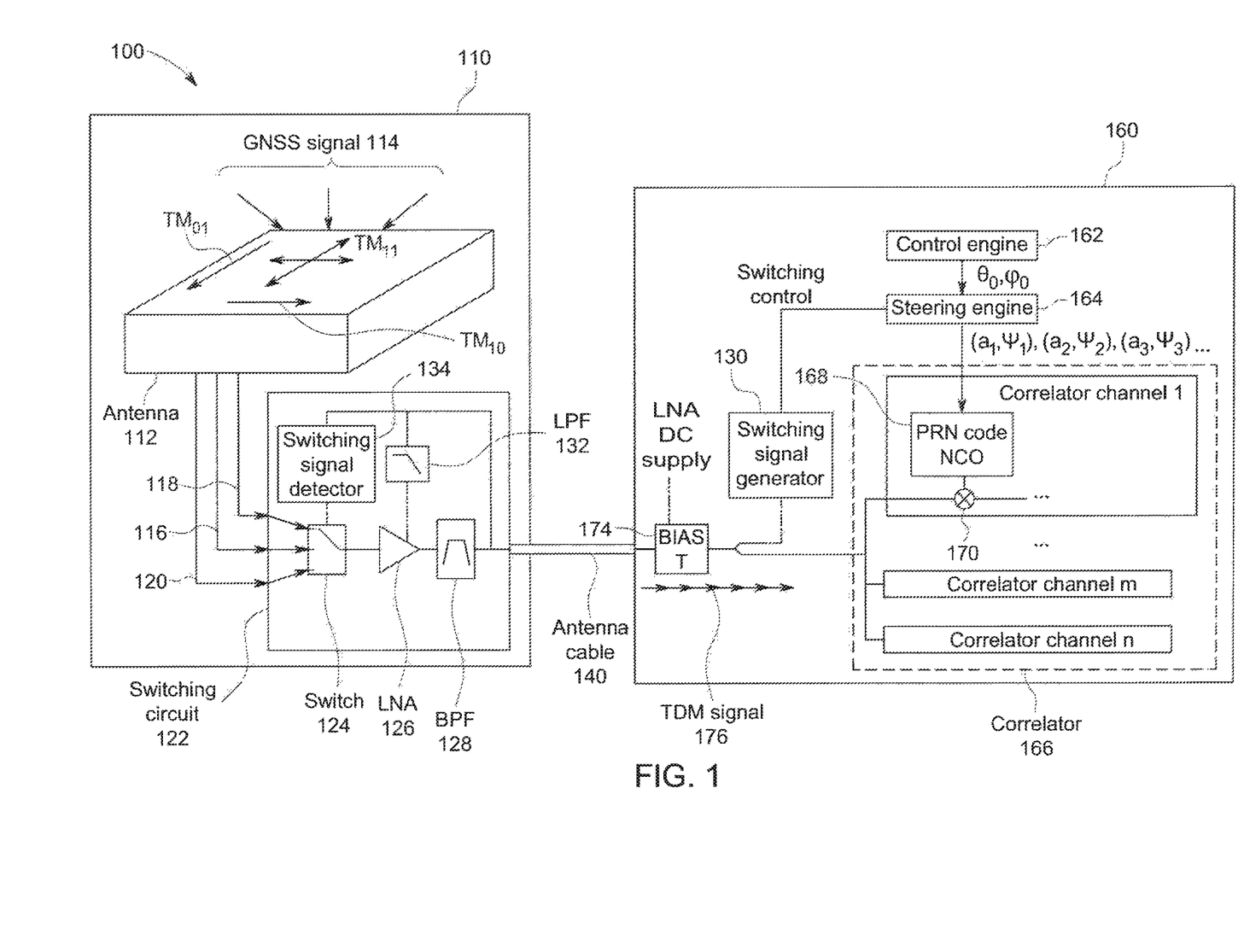
FIG. 1 is a schematic diagram illustrating an apparatus including an antenna assembly and a receiver, consistent with some embodiments of the present disclosure.

FIG. 1 is a schematic diagram illustrating an apparatus 100 including an antenna assembly and a receiver, consistent with some embodiments of the present disclosure. Referring to FIG. 1, apparatus 100 includes an antenna assembly 110, a receiver 160, and an antenna cable 140 that connects antenna assembly 110 and receiver 160. Antenna assembly 110 includes an antenna 112 and a switching circuit 122. Antenna 112 is configured to receive a GNSS signal 114. In an embodiment, GNSS signal 114 may be a single satellite band signal transmitted from a single satellite. The single satellite signal may have a corresponding pseudo-random noise (PRN) code. In another embodiment, GNSS signal 114 may include a plurality of satellite signals respectively transmitted from a plurality of satellites, and each of the plurality of satellite signals may have a corresponding PRN code. In an embodiment, GNSS signal 114 may also include signals originating from one or more virtual sources that reflect and/or scatter satellite signals. In an embodiment, GNSS signal 114 may include satellite signals reflected at an interface between two mediums. However, the signals received by antenna 112 are not limited to satellites signals, and can be any electromagnetic waves transmitted from any sources, for example, wireless cellular signals.

Antenna 112 includes a first feed point (not shown) that generates a first polarized signal 116, a second feed point (not shown) that generates a second polarized signal 118, and a third feed point (not shown) that generates a third polarized signal 120. In an embodiment, polarization of first polarized signal 116, second polarized signal 118, and third polarized signal 120 may form three orthogonal modes, for example, transverse magnetic 01 (TM01) mode, transverse magnetic 10 (TM10) mode, and transverse magnetic 11 (TM11) mode. However, the number of the feed points in antenna 112 is not limited to three, and can be any other number, for example, two or any number greater than three. Antenna 112 may be any antenna (e.g., a patch antenna, a helix antenna, a crossed bow antenna, orthogonally placed monopole antennas, etc.) that can have a plurality of feed points.

Polarization at the plurality of feed points in antenna 112 may be described using complex vectors (i.e., polarization vectors) representing directions of the electric field. For a number of feed points that is three, the polarization vectors may be configured so that they can be orthogonal to each other. For a number of feed points that is greater than three, the polarization vectors may be configured so that they can be orthogonalized to achieve a vector rank of three.

Switching circuit 122 includes a switch 124 that periodically switches between the first feed point, the second feed point, and the third feed point to select, for sampling, a polarized signal from each of first polarized signal 116, second polarized signal 118, and third polarized signal 120 at points in time, to form a time-division multiplexed signal. As a result, the time-division multiplexed signal is a combination of the sampled first polarized signal 116, the sampled second polarized signal 118, and the sampled third polarized signal 120 that form a single signal path. The switching may be done at a rate sufficiently high for the sampled signals to be recoverable by signal processing at receiver 160. For example, a switching period may be less than 1 ms. The switching in switch 124 is controlled by a switching signal that is generated by a switching signal generator 130 of receiver 160 and transmitted via antenna cable 140.

Switching circuit 122 may include a switching signal detector 134 that detects the switching signal. Switching signal detector 134 can be selected based on a type of the switching signal. For example, if the switching signal consists of different amplitude levels, a comparator can be used as the switching signal detector.

Switching circuit 122 may include a low noise amplifier (LNA) 126 that is coupled to switch 124 and configured to amplify the time-division multiplexed signal. LNA 126 may be supplied with a direct current (DC) bias provided by receiver 160. A low pass filter (LPF) 132 may be implemented in the path of the DC bias so that the switching signal, which is superimposed on the DC bias, can be filtered out before the DC bias is supplied to LNA 126. In an embodiment, LNA 126 may include a controller that controls parameters of an amplified signal. The parameters may include at least one of: gain, noise, linearity, bandwidth, output dynamic range, slew rate, rise rate, overshoot, or stability factor.

Switching circuit 122 may include a bandpass filter (BPF) 128 that is coupled to LNA 126 and configured to filter the amplified signal to suppress frequencies outside a range of interest. The filtered and amplified time-division multiplexed (TDM) signal is then transmitted to receiver 160, via antenna cable 140 and shown as a TDM signal 176, for further processing in the digital domain by receiver 160.

Antenna cable 140 electrically connects antenna assembly 110 and receiver 160 to transmit time-division multiplexed signal from antenna assembly 110 to receiver 160, and the switching signal and the DC bias signal from receiver 160 to antenna assembly 110. Antenna cable 140 may be a coaxial RF cable or any other cable suitable for transmitting an RF signal.

By using a switch in order to switch between the multiple antenna feed points and time-division multiplex the signals having different polarization directions, and processing the time-division multiplexed signal in the digital domain at the receiver, a need for recombining the different polarized signals in the RF domain is eliminated. This allows for a reduced size, a reduced cost, and reduced power consumption of apparatus 100. In addition, performing filtering and amplification of the time-division multiplexed signal on the antenna side and digitally processing the signal at the receiver, provides enhanced immunity of the signal reception and processing to temperature fluctuation.

In an embodiment, at least one of LNA 126 and BPF 128 may be implemented in the receiver side, rather than in the antenna side. In another embodiment, both receiver 160 and antenna assembly 110 include an LNA and a BPF.

Receiver 160 includes a bias tee (bias T) circuit 174 that provides the DC bias signal that is superimposed on the switching signal and transmitted to LNA 126 of switching circuit 122 of antenna assembly 110 via antenna cable 140.

Receiver 160 includes switching signal generator 130 that generates the switching signal that drives switching circuit 122 of antenna assembly 110. Switching signal generator 130 may be a pulse signal generator or an AC signal generator. The switching signal may be a synchronized signal formed by mixing a signal generated by switching signal generator 130 with a local oscillating signal provided by a local oscillator (not shown). A switching period may be in the order of 1 ms.

In an embodiment, the generated switching signal includes a plurality of signals having respective frequencies different from each other. Each of the plurality of polarized signals is provided with a corresponding one of the plurality of switching signals having respective frequencies different from each other.

In another embodiment, the switching signal may include a plurality of signals having respective signal magnitudes different from each other. Each of the plurality of polarized signals is provided with a corresponding one of the plurality of switching signals that have respective signal magnitudes different from each other. For example, the switching signal may be a pulse signal including a plurality of pulses having respective magnitudes different from each other.

In an embodiment, a supply bias may be added to the generated switching signal such that a positive pulse drives the switching and a negative pulse resets the switch sequence, or vice versa.

The generated switching signal is then transmitted to switching circuit 122 of antenna assembly 110 through antenna cable 140. The switching signal may be superimposed on the DC bias signal for transmission to antenna assembly 110.

Receiver 160 includes a control engine 162 that determines a desired null direction ($\theta_0$, $\varphi_0$). Control engine 162 may determine the desired null direction using a control loop that is operated to find a position or a direction of a source of interference by optimizing signal level and minimizing interference indicators in the receiver. For example, GNSS signal 114 by antenna 112 is a spread spectrum signal, and control engine 162 may determine a direction of a dominant multipath interference by operation of the control loop, and then determine the direction of the dominant multipath interference as the desired null direction. In addition to the desired null direction, control engine 162 may further determine a beam direction.

In an embodiment, based on the determination of the desired null direction, control engine 162 may further determine a desired amplitude and a desired phase for each of the plurality of polarized signals included in the time-division multiplexed signal. In an embodiment, control engine 162 may determine the desired amplitude and the desired phase for each of the plurality of polarized signals based on the desired null direction, a desired beam direction, a direction of a source of interference, or a direction of a dominant multipath interference, or any combination thereof. Control engine 162 may determine the desired amplitude and the desired phase for each of the plurality of polarized signals based on an optimization on-the-fly, if an antenna pattern (gain, phase, etc.) is known. Alternatively, control engine 162 may determine the desired amplitude and the desired phase for each of the plurality of polarized signals by using a model, for example, but not limited to, a low-order polynomial model.

In an embodiment, control engine 162 may be implemented as software and, the operations of control engine 162 can be accomplished by a program stored in a computer-readable storage medium and executed by a processor. The processor may be implemented inside receiver 160. In another embodiment, control engine 162 may be implemented as hardware that includes the program and a processor configured to execute the program to perform the functions of the control engine.

Receiver 160 includes a steering engine 164 that assigns a complex weight to each of the plurality of polarized signals included in the incoming TDM signal 176. In an embodiment, the complex weight includes a weight of an amplitude ($a_1$, $a_2$, $a_3$, etc.) and a weight of a phase ($\psi_1$, $\psi_2$, $\psi_3$, etc.) of each of the plurality of polarized signals. For example, steering engine 164 may assign a complex weight ($a_1$, $\psi_1$) to first polarized signal 116, a complex weight ($a_2$, $\psi_2$) to second polarized signal 118, and a complex weight ($a_3$, $\psi_3$) to third polarized signal 120.

In another embodiment, steering engine 164 may assign the complex weight to each of the plurality of polarized signals based on the desired null direction determined by control engine 162. For example, for a known antenna pattern (gain and phase), steering engine 164 may run an optimization on-the-fly to assign the complex weight to each of the plurality of polarized signals. Alternatively, steering engine 164 may use a model such as, for example, a low-order polynomial model to map the desired null direction to the complex weight of each of the plurality of polarized signals. Alternatively, steering engine 164 may obtain the complex weight corresponding to the desired null direction from a look-up table included in receiver 160. In this embodiment, determination of the desired amplitude and the desired phase for each of the plurality of polarized signals may not be performed by control engine 162.

Steering engine 164 also generates a switching control signal for switching signal generator 130. The generated switching control signal is then transmitted to switching signal generator 130 and controls signal generation at switching signal generator 130. In an embodiment, under control of the switching control signal, switching signal generator 130 may generate a switching signal such that the complex weight assigned for each of first polarized signal 116, second polarized signal 118, and third polarized signal 120 is reflected by operation of switch 124.

In an embodiment, steering engine 164 may be implemented as software and the operations of steering engine 164 can be accomplished by a program stored in a computer-readable storage medium and executed by a processor. The processor may be a processor implemented inside receiver 160. In another embodiment, steering engine 164 may be hardware that includes the program and a processor configured to execute the program to perform the functions of the steering engine.

In an alternative embodiment, control engine 162 and steering engine 164 may be merged into one operation that optimizes receiver parameters, for example, a carrier-to-noise density (C/NO) or a signal-to-noise ratio (SNR) of receiver 160.

Receiver 160 includes a correlator 166. Correlator 166 includes a plurality of correlator channels. Each of the plurality of correlator channels receives the incoming TDM signal 176. Each of the plurality of correlator channels includes a pseudo-random noise (PRN) code generator and a numerically controlled oscillator (NCO) coupled to a mixer. For example, correlator channel 1 includes a PRN code NCO 168 coupled to a mixer 170. In each correlator channel, the PRN code generator generates a unique PRN code for the incoming TDM signal 176.

In an embodiment, GNSS signal 114 received by antenna 112 is a signal transmitted from a single GNSS satellite, and correlator channel 1 (or any other correlator channel) is assigned to process the incoming TDM signal 176. The PRN code generator of correlator channel 1 generates a PRN code corresponding to the PRN code of the GNSS signal 114 from the single GNSS satellite. In correlator channel 1, the incoming TDM signal 176 is mixed by mixer 170 with a local oscillating signal generated by NCO 168 of correlator channel 1. The complex weight assigned to each of first polarized signal 116, second polarized signal 118, and third polarized signal 120 is applied to each signal. A weight of a phase for each signal may be applied by shifting the phase of each signal in the NCO based on the weight of the phase in the complex weight. A weight of an amplitude for each signal may be applied by adjusting the amplitude of each signal based on the weight of the amplitude in the complex weight. For example, in the complex weight $(a_1, \psi_1)$ that is assigned to first polarized signal 116, $a_1$ may indicate an amount to be multiplied with a current amplitude of first polarization signal 116, and $\psi_1$ may indicate a phase shift to be applied to a current phase of first polarized signal 116. The current amplitude and the current phase of first polarization signal 116 is adjusted based on $a_1$ and $\psi_1$. In this way, null-steering or beam steering can be accomplished by determining a desired null direction or desired beam direction, and assigning and applying complex weights to the plurality of polarized signals forming a time-division multiplexed signal during correlation.

The amplitude and/or phase adjusted polarized signals are correlated in the correlator channel 1 to form output signals for further processing. For example, correlated plurality of polarized signals may be recombined for tracking or positioning purpose.

In another embodiment, GNSS signal 114 received by antenna 112 includes a plurality of signals respectively transmitted from a plurality of different satellites. The plurality of different satellites may correspond to one or more satellite frequency bands. For example, the plurality of satellites may respectively correspond to a plurality of satellite frequency bands. In this embodiment, each of the plurality of correlator channels is assigned to a different one of the plurality of satellites. For example, receiver 160 may include a receiver manager (not shown) that assigns each of the plurality of correlator channels to a different one of the plurality of satellites based on a plurality of PRN codes respectively corresponding to the plurality of satellites. In an embodiment, the receiver manager may be implemented as software and the operations of assigning the plurality of satellite signals can be accomplished by a program stored in a computer-readable storage medium and executed by a processor. The processor may be a processor implemented inside the receiver. In this embodiment, control engine 162 may determine different desired null directions for the plurality of correlator channels, and steering engine 164 may assign a complex weight for each of a plurality of polarized signals in each correlator channel based on a desired null direction determined for each correlator channel. Each of the plurality of correlator channels may independently perform signal processing on the signal received from the corresponding one of the plurality of satellites. In this way, null steering can be performed on a local scale, for example, null steering can be applied to an individual satellite, rather than to a plurality of satellites, leading to an enhanced mitigation of multipath interference, spoofing, and jamming.

In an embodiment, the signal received by antenna 112 includes a first signal corresponding to a first frequency band and a second signal corresponding to a second frequency band. In this embodiment, the receiver manager assigns a first correlator channel of correlator 166 to the first frequency band signal based on a PRN code of the first frequency band signal and a second correlator channel of correlator 166 to the second frequency band signal based on a PRN code of the second frequency band signal.

Receiver 160 may include other components, such as an analog-to-digital converter (ADC). For brevity, descriptions of these components are omitted here.

By using single antenna 110 having a plurality of feed points that support different polarizations, time-division multiplexing the plurality of polarized signals using a switch, and then processing the time-division multiplexed signal in the digital domain at the receiver, there is no need to use an antenna array. As a result, size and cost associated with the antenna is reduced. The assignment of a complex weight including a weight of an amplitude and a weight of a phase to each of the plurality of polarized signals enables null steering for a satellite signal during correlation using the single antenna. By using the plurality of correlator channels of correlator 166 for the plurality of satellite signals, null steering is performed individually for each of the satellite signals, enabling enhanced accuracy of mitigation of multipath interference, jamming, and spoofing. In addition, superimposing multiple signals (e.g., the switching signal and the DC bias signal) carried by antenna cable 140 obviates the need for multiple antenna cables, which leads to reduced cost and size.

Figure 2:
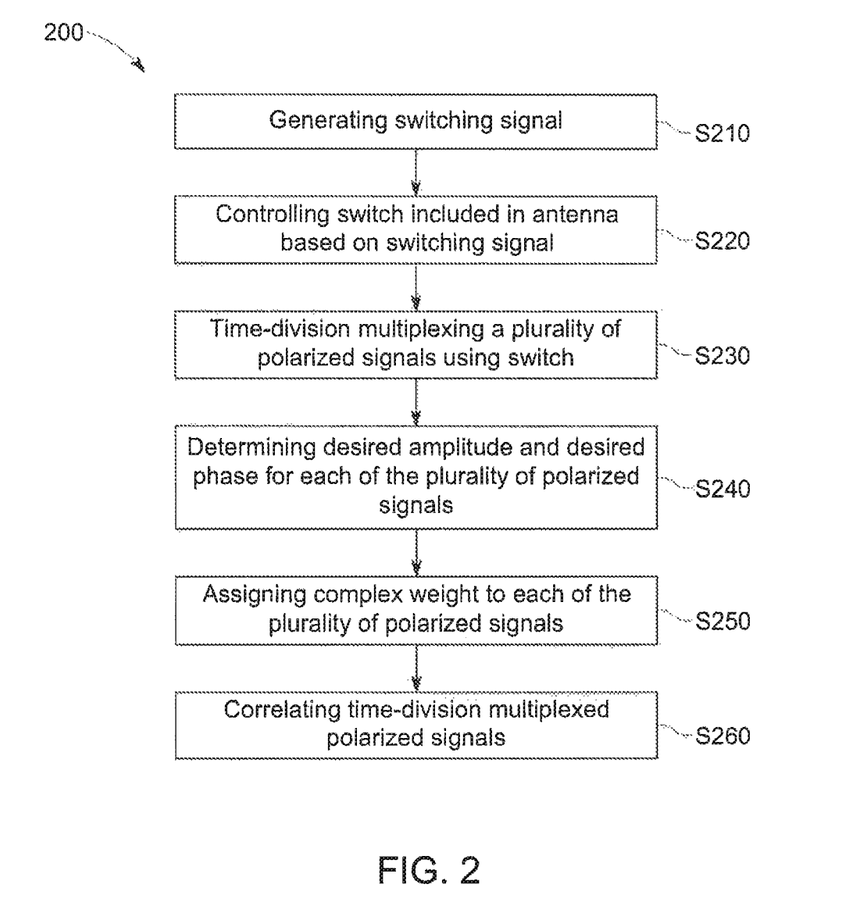
FIG. 2 is a flow chart illustrating an exemplary method for operating a device, consistent with some embodiments of the present disclosure.

FIG. 2 is a flow chart illustrating an exemplary method 200 for processing a signal, consistent with some embodiments of the present disclosure. The method may be performed by an apparatus, such as apparatus 100 of FIG. 1. Referring to FIG. 2, method 200 includes a step S210 of generating a switching signal. For example, the switching signal may be generated by a receiver, such as receiver 160 of FIG. 1. The switching signal may be synchronized by mixing with a local oscillating signal provided by a local oscillator. The generated switching signal may be transmitted to an antenna assembly, such as antenna assembly 110, via antenna cable 140.

Method 200 includes a step S220 of controlling a switch in the antenna assembly based on the switching signal. For example, the switching signal transmitted to antenna assembly 110 is used to control switch 124 of switching circuit 122 of antenna assembly 110.

Method 200 includes a step S230 of time-division multiplexing the plurality of polarized signals using the switch. For example, under the control of the switching signal, switch 124 of switching circuit 122 of antenna assembly 110 periodically switches between the plurality of feed points of antenna 112 and selects a signal at a point in time, thereby time-division multiplexing the plurality of polarized signals. The time-division multiplexed signal is then transmitted to receiver 160 for processing in the digital domain, for example, by a software-based signal processing at the receiver, for example, by control engine 162 and steering engine 164. In an embodiment, the time-division multiplexed signal may be amplified and filtered at antenna assembly 110 before transmitting to the receiver 160.

Method 200 includes a step S240 of determining a desired amplitude and a desired phase for each of the plurality of polarized signals in the time-division multiplexed signal. For example, the desired amplitude and the desired phase for each of the plurality of polarized signals in the time-division multiplexed signal may be determined by a control engine, such as control engine 162 of receiver 160, or by a steering engine, such as steering engine 164 of receiver 160. The desired amplitude and the desired phase for each of the plurality of polarized signals may be determined based on at least one of: a desired null direction, a desired beam direction, a direction of a source of interference, or a direction of a dominant multipath interference. The desired amplitude and the desired phase for each of the plurality of polarized signals may be determined by using an optimization on the fly or a model.

Method 200 includes a step S250 of assigning a complex weight to each of the plurality of polarized signals in the time-division multiplexed signal. The complex weight may include a weight of an amplitude and a weight of a phase of each of the plurality of polarized signals. In an embodiment, the complex weight for each of the plurality of polarized signals may be assigned by a steering engine, such as steering engine 164 of receiver 160 of FIG. 1. For example, the steering engine may obtain the complex weight corresponding to the desired null direction from a look-up table included in receiver 160. In another embodiment, the complex weight of each of the plurality of polarized signals may be assigned by the control engine. For example, the control engine may perform a sequential optimization procedure to determine on-the-fly a complex weight to be used for a given correlator channel.

Method 200 includes a step S260 of correlating the plurality of time-division multiplexed polarized signals. The correlating may be performed by a correlator, such as correlator 166 of receiver 160, that includes a plurality of correlator channels. In each correlator channel, an incoming time-division multiplexed signal is mixed by a mixer with a local oscillating signal generated by an NCO of the correlator channel. In each correlator channel, a unique PRN code corresponding to a signal transmitted from a satellite may be generated and the complex weight may be applied to each of the plurality of polarized signals.

Figure 3:
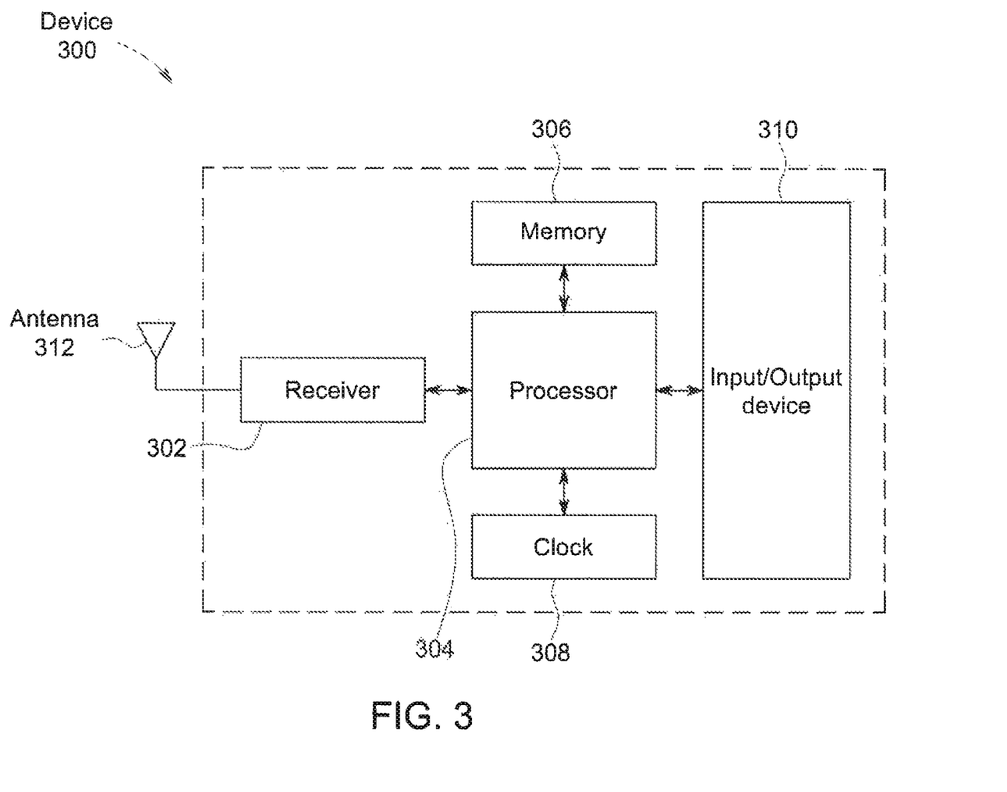
FIG. 3 is a block diagram of a device, consistent with some embodiments of the present disclosure.

FIG. 3 is a block diagram of an exemplary device 300, consistent with some embodiments of the present disclosure. Referring to FIG. 3, device 300 may take any form, including but not limited to, a laptop computer, a Global Positioning System (GPS), a wireless terminal including a mobile phone, a wireless handheld device, or wireless personal device, or any other forms. Device 300 includes a receiver 302, an antenna 312 coupled to receiver 302, a processor 304, a memory 306, a local clock 308, and an Input/Output device 310.

Receiver 302, coupled to antenna 312, is configured to receive a signal from one or more signal sources. In some embodiments, receiver 302 may be part of a transceiver modem which includes a transmitter configured to transmit data to an external device. Local clock 308 provides a time of a local place at which device 300 is disposed.

In an embodiment, similar to receiver 160 of FIG. 1, receiver 302 may implement a correlator including a plurality of correlator channels, such as correlator 166 of FIG. 1. Each of the plurality of correlator channels may be assigned to a different one of a plurality of signals transmitted from a corresponding one of a plurality of satellites. In each correlator channel, an incoming time-division multiplexed signal may be mixed by a mixer with a local oscillating signal generated by an NCO of the correlator channel.

In an embodiment, similar to receiver 160 of FIG. 1, receiver 302 may include a control engine, such as control engine 162 of FIG. 1, that determines a desired phase and a desired amplitude for each of the plurality polarized signal. Receiver 302 may also include a steering engine, such as steering engine 164, that assigns a complex weight for each of the plurality of polarized signals. The PRN code may be generated by a PRN code generator in each of the correlator channels. The control engine and/or the steering engine may be implemented as a program stored in a computer-readable storage of the receiver. Receiver 302 may include a built-in processor (not shown) configured to execute the program and performs the functions of the control engine and steering engine.

Receiver 302 may include a switching signal generator that generates a switching signal, such as switching signal generator 130 of FIG. 1. The generation of the switching signal may be controlled by the steering engine. Receiver 302 may include other components, such as a bias signal generator. For brevity, descriptions of these components are omitted here.

Processor 304 may include one or more dedicated processing units, application-specific integrated circuits (ASICs), field-programmable gate arrays (FPGAs), or various other types of processors or processing units. In an embodiment, the processor that is disposed inside receiver 302 may be a front-end processor that performs signal processing in receiver 302, and processor 304 may be a back-end processor that receives the signal processing results from receiver 302 and provides feedback to receiver 302. In this embodiment, processor 304 may also perform a portion of the digital domain signal processing of receiver 302. Processor 302 may perform additional computation, for example, for determining position of the receiver. Processor 304 may be further configured to control the performance of Input/Output device 310, clock 308, and memory 306. In another embodiment, receiver 302 does not have the built-in processor, and processor 304 performs all the functions of the built-in processor. In another embodiment, device 300 does not have processor 304, and the built-in processor of receiver 302 performs all the functions of processor 304.

Memory 306 may be any type of computer-readable storage medium including volatile or non-volatile memory devices, or a combination thereof. Memory 306 may store information related to identities of device 300 and the GNSS signals received by receiver 302. Memory 306 may also store post processing signals, for example, the correlated signals. Memory 306 may also store computer-readable program instructions and mathematical models that are used in signal processing in receiver 302 and computations performed in processor 304. Memory 306 may further store computer-readable program instructions for execution by processor 304 to operate device 300.

Input/Output device 310 may be used to communicate a result of signal processing to a user or another device. Input/Output device 310 may include a user interface including a display and an input device to transmit a user command to processor 304. The display may be configured to display a status of signal reception at device 300, the data stored at memory 306, a status of signal processing, and a result of the signal processing, etc. For example, the display may display results of null steering, beam steering, tracking, and positioning. The display may include, but is not limited to, a cathode ray tube (CRT), a liquid crystal display (LCD), a light-emitting diode (LED), a gas plasma display, a touch screen, or other image projection devices for displaying information to a user. The input device may be any type of computer hardware equipment used to receive data and control signals from a user. The input device may include, but is not limited to, a keyboard, a mouse, a scanner, a digital camera, a joystick, a trackball, cursor direction keys, a touchscreen monitor, or audio/video commanders, etc. Input/Output device 310 may further include a machine interface, such as an electrical bus connection or a wireless communications link.

The computer-readable storage medium of the present disclosure may be a tangible device that can store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

The computer-readable program instructions of the present disclosure may be assembler instructions, instruction-set-architecture (ISA) instructions, machine instructions, machine-dependent instructions, microcode, firmware instructions, state-setting data, or source code or object code written in any combination of one or more programming languages, including an object-oriented programming language, and conventional procedural programming languages. The computer-readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The flowcharts and block diagrams in the figures illustrate examples of the architecture, functionality, and operation of possible implementations of systems, methods, and devices according to various embodiments. It should be noted that, in some alternative implementations, the functions noted in blocks may occur out of the order noted in the figures. For example, two blocks shown in succession may, in fact, be executed substantially concurrently, or the blocks may sometimes be executed in the reverse order, depending upon the functionality involved.

It is understood that the described embodiments are not mutually exclusive, and elements, components, materials, or steps described in connection with one example embodiment may be combined with, or eliminated from, other embodiments in suitable ways to accomplish desired design objectives.

Reference herein to "some embodiments" or "some exemplary embodiments" means that a particular feature, structure, or characteristic described in connection with the embodiment can be included in at least one embodiment. The appearance of the phrases "one embodiment" "some embodiments" or "another embodiment" in various places in the present disclosure do not all necessarily refer to the same embodiment, nor are separate or alternative embodiments necessarily mutually exclusive of other embodiments.

It should be understood that the steps of the example methods set forth herein are not necessarily required to be performed in the order described, and the order of the steps of such methods should be understood to be merely example. For example, two blocks shown in succession may, in fact, be executed substantially concurrently, or the blocks may sometimes be executed in the reverse order, depending upon the functionality involved. Likewise, additional steps may be included in such methods, and certain steps may be omitted or combined, in methods consistent with various embodiments.

As used in the present disclosure, the word "exemplary" is used herein to mean serving as an example, instance, or illustration. Any aspect or design described herein as "exemplary" is not necessarily to be construed as preferred or advantageous over other aspects or designs. Rather, use of the word is intended to present concepts in a concrete fashion.

As used in the present disclosure, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

Additionally, the articles "a" and "an" as used in the present disclosure and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

Although the elements in the following method claims, if any, are recited in a particular sequence, unless the claim recitations otherwise imply a particular sequence for implementing some or all of those elements, those elements are not necessarily intended to be limited to being implemented in that particular sequence.

It is appreciated that certain features of the present disclosure, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

It will be further understood that various modifications, alternatives and variations in the details, materials, and arrangements of the parts which have been described and illustrated in order to explain the nature of described embodiments may be made by those skilled in the art without departing from the scope. Accordingly, the following claims embrace all such alternatives, modifications and variations that fall within the terms of the claims.

What is claimed is:

1. An apparatus, comprising:
   an antenna assembly, comprising:
      an antenna configured to receive a signal and generate, at a plurality of feed points of the antenna, a plurality of corresponding polarized signals having respective polarization directions different from each other, using the received signal; and
      a switching circuit configured to periodically switch between the plurality of feed points to select a corresponding one of the polarized signals among the plurality of polarized signals at a point of time based on a switching signal;
   a receiver, coupled to receive the selected polarized signal, configured to:
      process the selected polarized signal; and
      generate the switching signal based on the processing; and
   a cable that couples the antenna assembly and the receiver and is configured to:
      transmit the selected polarized signal from the antenna assembly to the receiver; and
      transmit the generated switching signal from the receiver to the antenna assembly.

2. The apparatus of claim 1, wherein:
   the switching signal controls a switch in the switching circuit to switch between the plurality of feed points, and
   the switching circuit is configured to time-division multiplex the plurality of polarized signals based on the switching signal and generate a time-division multiplexed signal.

3. The apparatus of claim 2, the receiver further comprising:
   a control engine configured to determine a desired amplitude and a desired phase for each of the plurality of polarized signals; and
   a steering engine configured to assign a complex weight to each of the plurality of polarized signals based on the desired amplitude and the desired phase for each of the plurality of polarized signals, wherein the complex weight comprises a weight of an amplitude and a weight of a phase.

4. The apparatus of claim 3, wherein:
   the signal received by the antenna is a spread spectrum signal, and
   the control engine comprises a control loop configured to determine the desired amplitude and the desired phase for each of the plurality of polarized signals based on at least one of:
      a desired null direction;
      a desired beam direction;
      a direction of a source of interference; or
      a direction of a dominant multipath interference.

5. The apparatus of claim 3, the receiver further comprising:
   a correlator configured to correlate the time-division multiplexed signal generated by the switching circuit.

6. The apparatus of claim 5, wherein the correlator comprises a correlator channel including a numerically controlled oscillator and a pseudo-random noise (PRN) code generator.

7. The apparatus of claim 6, wherein:
   the PRN code generator is configured to generate a PRN code corresponding to the signal received by the antenna.

8. The apparatus of claim 7, wherein, in the correlator channel, the complex weight assigned to each of the plurality of polarized signals is applied to the correlated time-division multiplexed signal by:
   shifting a phase of the correlated signal in the numerically controlled oscillator based on the weight of the phase in the complex weight; and
   adjusting amplitude of the correlated signal based on the weight of the amplitude in the complex weight.

9. The apparatus of claim 1, wherein the receiver further comprises a switching signal generator configured to generate, as the switching signal, a pulse signal or an alternating current signal.

10. The apparatus of claim 3, wherein the control engine is configured to determine the desired amplitude and the desired phase for each of the plurality of polarized signals by using an optimization on the fly or a model.

11. The apparatus of claim 9, wherein the antenna assembly further comprises a switching signal detector configured to detect the switching signal generated by the switching signal generator.

12. The apparatus of claim 1, wherein:
   the antenna assembly further comprises:
      a low noise amplifier configured to amplify the selected polarized signal;
      a low pass filter configured to filter the switching signal; and
      a band pass filter configured to receive and filter the amplified signal, and the receiver further comprises:
      a bias circuit configured to provide a direct current (DC) bias to the low noise amplifier of the antenna assembly.

13. The apparatus of claim 5, wherein:
the signal received by the antenna comprises a plurality of signals respectively transmitted from a plurality of different satellites, and
the correlator comprises a plurality of correlator channels, each of the plurality of correlator channels is assigned to a different one of the plurality of signals, and each of the plurality of correlator channels includes a numerically controlled oscillator and a PRN code generator.

14. The apparatus of claim 13, wherein the plurality of signals respectively correspond to a plurality of PRN codes, and the receiver is configured to assign each of the plurality of PRN codes to a corresponding one of the plurality of correlator channels.

15. The apparatus of claim 5, wherein:
the signal received by the antenna comprises a first signal corresponding to a first frequency band and a second signal corresponding to a second frequency band, and
the correlator comprises a first correlator channel corresponding to the first frequency band based on a PRN code of the first frequency band and a second correlator channel corresponding to the second frequency band based on a PRN code of the second frequency band.

16. The apparatus of claim 1, wherein the plurality of feed points comprise at least three feed points.

17. A method for operating a device, wherein the device comprises an antenna configured to receive a signal and generate a plurality of polarized signals having respective polarization directions different from each other, the method comprising:
generating a switching signal;
controlling a switch in the antenna based on the generated switching signal;
time-division multiplexing the plurality of polarized signals using the switch;
determining a desired amplitude and a desired phase for each of the plurality of polarized signals;
assigning a complex weight to each of the plurality of polarized signals, wherein the complex weight comprises a weight of an amplitude and a weight of a phase; and
correlating the plurality of time-division multiplexed polarized signals.

18. A non-transitory computer-readable medium having stored therein instructions that, when executed by a processor, perform a method for controlling a device, the method comprising:
generating, by the device, a switching signal;
transmitting, to an antenna assembly, the generated switching signal so that the switching signal drives a switch in the antenna assembly;
receiving, from the antenna assembly, a time-division multiplexed signal generated by periodically selecting a polarized signal from a plurality of polarized signals based on the switching signal;
determining, by the device, a desired amplitude and a desired phase for each of the plurality of polarized signals;
assigning, by the device, a complex weight to each of the plurality of polarized signals, wherein the complex weight comprises a weight of an amplitude and a weight of a phase; and
correlating, by the device, the plurality of time-division multiplexed polarized signals.

* * * * *